United States Patent [19]

Brownawell et al.

[11] Patent Number: 5,069,799
[45] Date of Patent: Dec. 3, 1991

[54] METHOD FOR REJUVENATING LUBRICATING OILS

[75] Inventors: Darrell W. Brownawell, Scotch Plains; Paul K. Ladwig, Randolph, both of N.J.

[73] Assignee: Exxon Research & Engineering Company, Florham Park, N.J.

[21] Appl. No.: 404,154

[22] Filed: Sep. 7, 1989

[51] Int. Cl.⁵ .............................................. B01D 37/00
[52] U.S. Cl. .................................... 210/749; 210/806; 210/314; 210/315; 210/335; 210/338; 210/416.5; 210/209; 208/182; 208/183
[58] Field of Search ............... 210/295, 335, 338, 314, 210/315, 209, 690, 168, 416.5, 909, 749, 806; 208/182, 183

[56] References Cited

U.S. PATENT DOCUMENTS

| | | | |
|---|---|---|---|
| 1,914,999 | 6/1933 | Maverick et al. | 208/183 |
| 3,529,719 | 9/1970 | Graybill | 208/182 |
| 4,075,098 | 2/1978 | Paul et al. | 210/168 |
| 4,501,660 | 2/1985 | Hebert | 210/209 |
| 4,557,829 | 12/1985 | Fields | 210/315 |

FOREIGN PATENT DOCUMENTS

| | | |
|---|---|---|
| 282840 | 12/1986 | Fed. Rep. of Germany . |
| 507064 | 6/1939 | United Kingdom . |
| 836993 | 6/1965 | United Kingdom . |

OTHER PUBLICATIONS

WO 86/03687—Selsdon, Leslie, *Filters*; Jul. 3, 1986, published under the Patent Cooperation Treaty (PCT).

*Primary Examiner*—Stanley S. Silverman
*Assistant Examiner*—Krisanne Shideler
*Attorney, Agent, or Firm*—John W. Ditsler

[57] ABSTRACT

A filter system containing, in series, a first filter media having a chemically active filter media, a physically active filter media, or mixtures thereof and a second filter media having an inactive filter media can effectively rejuvenate used lubricating oils. In a preferred embodiment, the chemically or physically active filter media will be within a cannister that is separate from a container having both active and inactive filter media.

4 Claims, 3 Drawing Sheets

METHOD FOR REJUVENATING LUBRICATING OILS

BACKGROUND OF THE INVENTION

1. Field of the Invention

This invention concerns a filter system and its use to rejuvenate used lubricating oils.

2. Description of Related Art

The use of both single and two-stage filters for treating lubricating oils is known (see, for example, U.S. Pat. Nos. 2,302,552; 3,390,778; 3,489,676; 3,749,247; and more recently European Patent Application number 88300090.3, having Publication number 0 275 148 and published July 20, 1988, the disclosures all of which are incorporated herein by reference).

However, none of these publications disclose the particular filter system described hereinafter.

SUMMARY OF THE INVENTION

This invention concerns a replaceable filter system and its use to rejuvenate used lubricating oils. More specifically, used lubricating oils can be rejuvenated by passing the oil, in series, through (1) a chemically active filter media, a physically active filter media, or mixtures thereof and then through (2) an inactive filter media. By "rejuvenate" is meant that a chemical property, a physical property, or both of a used lubricating oil is improved so that the oil is at least partially restored to the quality of a fresh or unused lubricating oil. The chemically active, physically active, and inactive filter medias may all be located within the same container or be in separate containers. Alternatively, two of the filter medias may be within the same container. In a preferred embodiment, the filter system comprises a two-stage filter in which the chemically active filter media, the physically active filter media, or mixtures thereof is located in a separate cannister that is attached to a filter containing both active and inactive filter media.

DETAILED DESCRIPTION OF THE INVENTION

Figure 1:
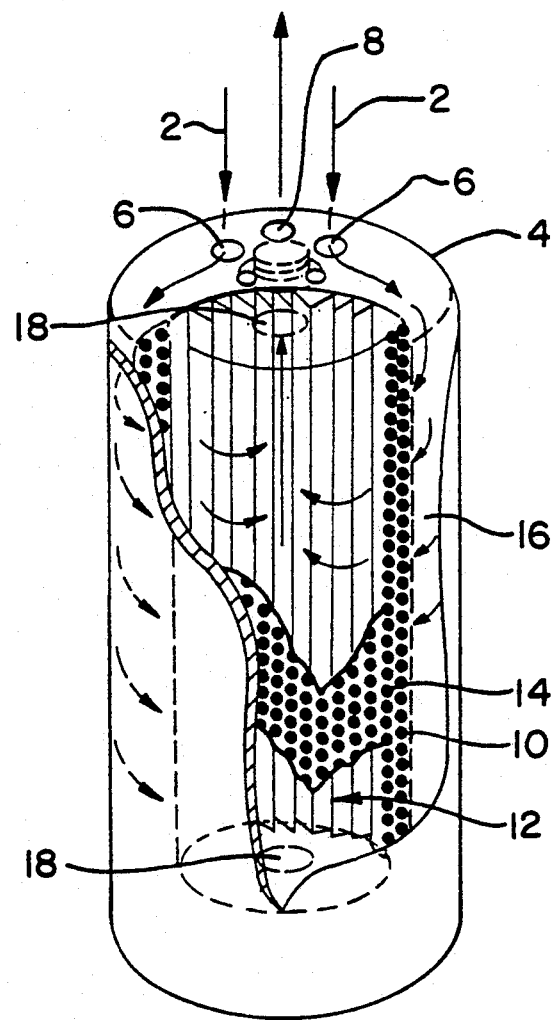
FIG. 1 is a diagram showing a single-stage embodiment of the filter system of this invention.

The filter system of this invention requires (1) a filter media that is chemically active, physically active, or a combination thereof, and (2) a filter media that is inactive.

By "chemically active filter media" is meant a filter media that chemically interacts with the used lubricating oil (e.g., by chemical adsorption, acid/base neutralization, and the like). By "physically active filter media" is meant a filter media that interacts with the lubricating oil by other than chemical interaction (e.g., by physical adsorption). By "inactive filter media" is meant a filter media that is inert and does not interact with the lubricating oil except to remove particulates from the oil.

The chemically active ingredients in the chemically active filter media may be supported on a substrate or be unsupported. If supported, suitable substrates include alumina, activated clay, cellulose, cement binder, silica-alumina, polymer matrices, activated carbon, and the like. Typically, high surface substrates such as alumina, cement binder, a polymer matrix, and activated carbon are preferred. The substrate may be formed into various shapes such as pellets, cylinders, or spheres. The substrate may (but need not) be inert.

One example of a chemically active filter media is a filter media that is (or contains) a strong base which is insoluble or substantially insoluble in the oil. Suitable strong bases include, but are not limited to, barium oxide (BaO), calcium carbonate ($CaCO_3$), calcium oxide (CaO), calcium hydroxide ($Ca(OH)_2$), magnesium carbonate ($MgCO_3$), magnesium hydroxide ($Mg(OH)_2$), magnesium oxide (MgO), sodium aluminate ($NaAlO_2$), sodium carbonate ($Na_2CO_3$), sodium hydroxide (NaOH), zinc oxide (ZnO), or their mixtures. Preferred strong bases are magnesium oxide, sodium hydroxide, and zinc oxide. A chemically active filter media containing a strong base can be used in several applications. For example, the strong base may be used to remove soot from a lubricating oil by contacting the soot (which has an acidic surface) with the base (see copending application U.S. Ser. No. 404,032 filed on the same date herewith. In this application, "strong base" means a base that will cause the soot to become immobilized as deposits on the chemically active filter media. As another example, a chemically active filter media containing a strong base can be used to displace a weak base from soluble neutral salts formed by reacting combustion acids with a soluble weak base in the oil (see copending application U.S. Ser. No. 269,274 filed Nov. 9, 1988 now U.S. Pat. No. 4,906,389). In this application, "weak base" refers to a base that has a PKa from about 4 to about 12, and "strong base" refers to a base that will displace the weak base from the neutral salts and return the weak base to the oil. Once the weak base has been displaced from the soluble neutral salts, the remaining strong base/combustion acid salts will be immobilized as deposits on the filter media.

Another example of a chemically active filter media is a filter media capable of decomposing hydroperoxides present in the lubricating oil to essentially harmless species that are oil soluble (see copending application U.S. Ser. No. 404,250 filed on the same date herewith. The hydroperoxide decomposer should be insoluble or substantially insoluble in the oil. Suitable hydroperoxide decomposers include $MoS_2$, $Mo_4S_4(ROCS_2)_6$, and NaOH. $Mo_4S_4(ROCS_2)_6$ and NaOH are preferred, with NaOH being most preferred. As disclosed in copending application U.S. Ser. No. 404,250 filed on the same date herewith, $Mo_4S_4(ROCS_2)_6$ is formed by reacting molybdenum hexacarbonyl ($Mo(CO)_6$) with a dixanthogen $[(ROCS_2)_2]$. The reaction is conducted at temperatures ranging from about ambient conditions (e.g., room temperature) to about 140° C., especially between about 80° to about 120° C., for from about 2 to about 10 hours. For example, the $Mo(CO)_6$ and the dixanthogen may be refluxed in toluene for times ranging from about 2 to about 8 hours. The reaction time and temperature will depend upon the dixanthogen selected and the solvent used in the reaction. However, the reaction should be conducted for a period of time sufficient to form the compound. Solvents that are useful in the reaction include aromatic hydrocarbons, especially toluene.

Dixanthogens which are especially useful can be represented by the formula $(ROCS_2)_2$ in which R can be the same or different organo groups selected from alkyl, aralkyl, and alkoxyalkyl groups having a sufficient number of carbon atoms such that the compound formed is soluble in a lubricating oil. Preferably R will have from 2 to 20 carbon atoms. More preferably, R will be an alkyl group having from 2 to 20 carbon atoms, especially from 4 to 12 carbon atoms.

In forming $Mo_4S_4(ROCS_2)_6$, the mole ratio of dixanthogen to molybdenum hexacarbonyl should be greater than about 1.5 to 1.0. For example, in preparing this compound, mole ratios of $(ROCS_2)_2$ to $Mo(CO)_6$ in the range of from about 1.6:1 to about 2:1 are preferred.

Depending primarily upon the time and temperature at which the $Mo(CO)_6$ and $(ROCS_2)_2$ are reacted, the molybdenum and sulfur containing additive that forms is a brown compound, a purple compound, or a mixture of both. Shorter reaction times (e.g., four hours or less) favor the formation of the purple compound. Longer reaction times (e.g., four hours or more) favor formation of the brown compound. For example, when $(C_8H_{17}OCS_2)_2$ is reacted with $Mo(CO)_6$ in toluene for four hours at 100° to 110° C., most of the starting material is converted to the purple compound, with virtually none of the brown compound being present. However, continued heating of the reaction mixture results in conversion of the purple compound to the brown compound. Indeed, after about six or seven hours, the purple form is largely converted to the brown form.

In general, the $Mo(CO)_6$ and dixanthogen are contacted for a period of time sufficient for reaction to occur, but typically less than about 7 hours. Beyond 7 hours, undesirable solids begin to form. To maximize the formation of the compound and minimize the formation of undesirably solid by-products, the $Mo(CO)_6$ should be reacted with the dixanthogen at temperatures of about 100° to about 120° C. for times ranging from about five to six hours, thereby producing reaction mixtures which contain both the brown and purple forms of the compounds. This is not a disadvantage because both forms are effective additives, and mixtures of the two species (brown and purple) perform as well as either species alone.

The compounds formed with R groups between about $C_4H_9$ and about $C_{14}H_{29}$ can be readily separated from oily organic by-products of the reaction by extracting the oily by-products with moderately polar solvents such as acetone, ethyl alcohol, or isopropyl alcohol. The compounds with these R groups are substantially insoluble in such solvents, while the oily by-products are soluble. Separation of the compounds from the by-products, however, is not necessary because the by-products do not detract from the beneficial functional properties of the compounds.

The physical properties of the purple and brown forms vary with the R group. For example, the compound is a crystalline solid when R is $C_2H_5$ and an amorphous solid when R is larger than about $C_7H_{15}$.

The purple compound formed in reacting $Mo(CO_6)$ with $(ROCS_2)_2$ is a thiocubane of the formula $Mo_4S_4(ROCS_2)_6$.

The brown compound formed in reacting $Mo(CO_6)$ with $(ROCS_2)_2$ is also believed to have a structure very similar to the thiocubane structure of the purple compound based on its ease of formation from the purple compound and chemical analysis.

Still another example of a chemically active filter media is disclosed in copending application U.S. Ser. No. 404,040 filed on the same date herewith, in which the filter media contains a dispersant functional group that is insoluble or substantially insoluble in the oil. By "dispersant functional group" is meant that portion of a conventional lubricating oil dispersant that complexes or reacts with sludge and varnish precursors in the oil (the other portion of a conventional dispersant is a solubilizing group such as polyisobutylene). Examples of suitable dispersant functional groups include amines, polyamines, morpholines, oxazolines, piperazines, alcohols, polyols, polyethers, or substituted versions thereof (e.g., alkyl, dialkyl, aryl, alkaryl, or aralkyl amines, etc.). When the sludge in the oil contacts the dispersant functional group on the filter media, the sludge complexes with the dispersant functional group and is removed from the oil as a deposit on the filter media.

The physically active filter media includes the same substrates suitable for use with the chemically active filter media as well as other substrates such as attapulgus clay, dolomite clay, and molecular sieves.

An example of a physically active filter media is a media (such as activated carbon) that can remove polynuclear aromatics (PNA) from used lubricating oil, especially PNA's with at least three aromatic rings (as is disclosed in European Patent Application number 88300090.3, which corresponds to Publication number 0 275 148). Another example of a physically active filter media is also disclosed in European Patent Application number 88300090.3 wherein the filter media is mixed, coated, or impregnated with one or more additives normally present in lubricating oils. These additives are oil soluble such that they will be slowly released into the oil to replenish the additives in the oil as they are depleted during its use of the oil.

Suitable inactive filter media may be found in today's conventional engine oil filters and include porous paper (e.g. pleated paper), glass fibers, spun polymer filament, and the like. The inactive filter media serves to retain and remove solid particles from the oil.

The precise amount of active filter media used will vary with the particular function to be performed. For example, significant removal of PNA's can be obtained using from about 0.25 to about 2.5 wt. % of activated carbon (based on weight of the oil). Similarly, a significant removal of hydroperoxides can be obtained using from about 0.02 to about 1.0 wt. % of $Mo_4S_4(C_8H_{17}OCS_2)_6$, based on weight of the oil.

Figure 2:
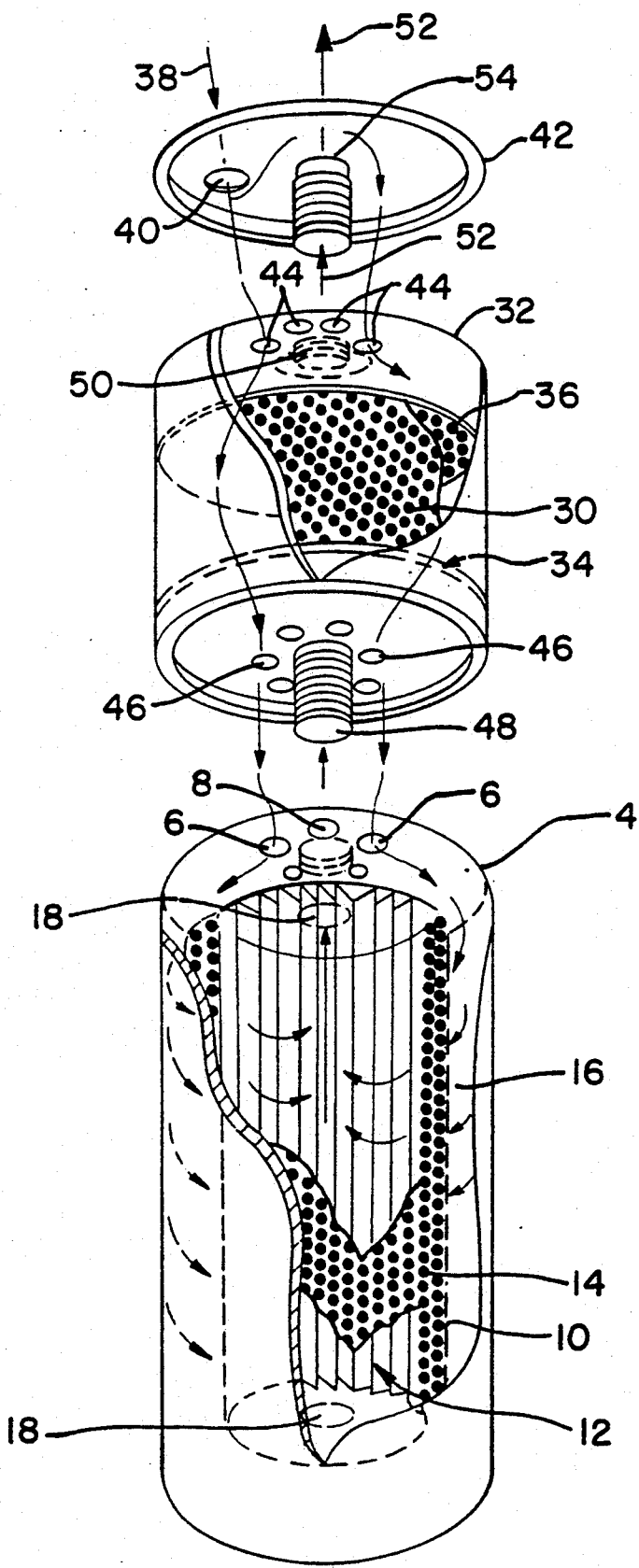
FIG. 2 is a diagram showing a two-stage embodiment of the filter system of this invention.

The filter system of this invention will be better understood by reference to the single-stage and two-stage embodiments shown in FIGS. 1 and 2, respectively.

FIG. 1 depicts a modified conventional engine oil filter in which a used lubricating oil 2 is passed into a filter housing 4 having one or more used oil inlets 6 and a rejuvenated oil outlet 8. Within filter housing 4 is a permeable partition 10 (such as a wire mesh screen) that surrounds an inactive filter media 12. Permeable partition 10 and inactive filter media 12 are located such that an annular space is formed between them. Within this annular space is a filter media 14 which contains a chemically active filter media, a physically active filter media, or a mixture thereof. Permeable partition 10 and filter housing 4 are similarly located such that an annular space 16 is formed.

Used oil 2 enters filter housing 4 through used oil inlets 6 and travels down the annular space 16. The used oil then passes, in series, through permeable partition 10, filter media 14, inactive filter media 12, and into a cylindrical space 18 that extends the length of filter housing 4. Cylindrical space 18 connects with rejuvenated oil outlet 8 and serves as a conduit for the rejuvenated oil to exit the filter system. In this embodiment, cylindrical space 18 is closed at the end opposite of rejuvenated oil outlet 8 so that the rejuvenated oil must exit through outlet 8.

A preferred embodiment of this invention is the two-stage filter system shown in FIG. 2 wherein a filter media 30 is contained within a cannister housing 32 (the first stage) that is separate from (but capable of being connected to) filter housing 4 (the second stage). Filter media 30 is a chemically active filter media, a physically filter media, or a mixture thereof. Filter media 30 is located within cannister housing 32 between support means 34 (e.g. a support grid) and a distribution means 36. As shown in FIG. 2, used lubricating oil 38 enters cannister housing 32 through an opening 40 which is located on the cover 42 of the cannister. After passing through used oil inlets 44, the oil contacts distribution means 36 which evenly distributes the oil over the surface of filter media 30. This promotes efficient contacting as the oil passes through filter media 30. Preferably, filter media 30 is in contact or close proximity with distribution means 36. The oil then passes through support means 34 and exits cannister housing 32 through cannister oil outlets 46, which are alligned with oil inlets 6 of filter housing 4 such that the oil flows directly into filter housing 4. After passing through filter housing 4 as described previously in FIG. 1, the rejuvenated oil exits filter housing 4 through outlet 8, which is alligned to a corresponding oil inlet 48 in cylindrical space 50 within the central core of cannister housing 32. The rejuvenated oil 52 passes through cylindrical space 48 and is returned to the engine via outlet 54.

There are many variations possible with the filter system of this invention. For example, filter media 30 may be supported on the same (or different) substrates as filter media 14. Similarly, the chemically active ingredients in filter media 30 and in filter media 14 may be the same or different. In some cases, the use of the two-stage embodiment eliminates the need for filter media 14 such that filter housing 4 may contain only inactive filter media 12. In other cases, partition means 10 could be eliminated such that the chemically active filter media, physically active filter media, or mixture thereof would fill the space between circular housing 4 and inactive filter media 12.

The two-stage filter system shown in FIG. 2 can also be modified to treat used lubricating oil using a series of chemically active or physically active filter media that have been tailored to perform a specific function on the oil. For example, chemically active filter media 30 in cannister housing 32 may be subdivided into three chemically active filter media, each of which contains a different chemically active ingredient tailored to perform a specific function. The three subdivided filter media comprising filter media 30 may be separated from one another by partition means (not shown). If the first subdivided filter media were to contain a strong base, the second a hydroperoxide decomposer, and the third a dispersant function group, then acids in the oil passing through filter media 30 would first be neutralized by the strong base in the first subdivided filter media, with the acid salts thus formed being immobilized as deposits on the filter media. The strong base could also immobilize any soot that might be present in the oil. The oil would then pass through a first partition means into the second subdivided filter media where hydroperoxides in the oil would be decomposed to harmless oil soluble products.

The oil would then pass through a second partition means into the third subdivided filter media where sludge in the oil would complex with the dispersant functional group such that the sludge becomes immobilized on this filter media. Finally, the partially treated oil could pass from cannister housing 32 into filter housing 4 where PNA's in the oil would be removed by contacting a physically active filter media 14 of activated carbon. The rejuvenated oil would then be ready for reuse.

Using a cannister containing separate compartments of different chemically active filter media described above has several advantages over conventional oil filters in rejuvenating used oil:

The dispersant functional group is more effective in removing sludge if the basicity/acidity of the oil has been adjusted in the first compartment of the cannister filter.

Inactive filter media 12 can be used for a longer period of time if sludge is removed from the oil by a filter media in cannister housing 32 rather than being permitted to accumulate on inactive filter media 12.

If concentric compartments containing different filter media were used in a conventional single stage filter, the total diameter of the resulting filter would be large enough to make it virtually unuseable in the confined underhood space of modern automotive vehicles.

Better flow distribution (i.e., less channeling) is obtained with the two-stage design than with the conventional single-stage design.

If active filter media is not needed in both stages of the two-stage filter, it is more economical to place the active filter media in the cannister filter and use it with a conventional single-stage filter containing only inactive filter media. Since the inactive filter media is designed to have a large surface area to avoid becoming plugged by particulates in the oil, any active filter media surrounding the inactive filter media would have a thin (or narrow) bed depth to accommodate current filter designs. However, a thin bed would limit the effectiveness of the active filter media because a deeper bed depth is more effective for chemical and physical interactions than a shallow bed depth. Accordingly, although the cannister design has a relatively small cross-sectional area, it has a thicker bed depth such that a more effective oil treatment can be obtained for the same amount of active filter media. This arrangement is particularly preferred when the active media has a longer lifetime than the oil or the inactive filter media (i.e., the cannister containing the active media may not have to be changed with the oil or conventional filter).

Thus, the two-stage design is flexible and offers the most economical solution to a variety of filter needs.

The filter system of this invention can be used to rejuvenate lubricating oils from the lubrication system of essentially any internal combustion engine, including automobile and truck engines, two-cycle engines, aviation piston engines, marine and railroad engines, gas-fired engines, alcohol (e.g. methanol) powered engines, stationary powered engines, turbines, and the like. However, this filter system can also be suitably applied to essentially any oil (e.g., industrial lubricating oils) whose chemical or physical properties can be improved. Such lubricating oils can be derived from natural basestocks, synthetic basestocks, or mixtures thereof, and may contain one or more additives (e.g.

antiwear agents, VI improvers, pour point depressants, and the like). Although not necessary, it is preferred that the filter system be located within the lubrication system of an internal combustion engine.

This invention is applicable to a variety of filter system designs. As such, although the filter system in FIGS. 1 and 2 has been described for a cylindrical design, no specific structural design of the filter is necessary.

This invention may be futher understood by reference to the following examples which are not intended to restrict the appended claims.

EXAMPLE 1

PNA Removal Using Single-Stage and Two-Stage Filter Systems

Used lubricating oil was collected from a number of automobiles operating on lead-free gasoline for 5,000 miles with standard commercially available single-stage engine oil filters containing pleated paper as an inactive filter media. A mixture of the oils was analyzed and found to contain 1865 ppm polynuclear aromatics (PNA's).

A portion of this mixture was placed in a Ford Escort and operated for 1,000 miles on a lead-free gasoline using a two-stage filter system comprising a separate cannister containing 50 grams of a physically active filter media (activated carbon) attached to a conventional filter containing an inactive filter media of pleated paper. At the end of 1,000 miles, the used oil was analyzed for PNA's. Assuming that the PNA's continued to increase at the same rate as they had increased for the first 5,000 miles, this two-stage filter system reduced the PNA content of the used oil by 34%.

A second portion of the 5,000 mile used oil was placed in a second Ford Escort. This car was also operated for 1,000 miles with the same lead-free gasoline used in the first car. However, the second car used the two-stage filter system shown in FIG. 2 in which the first stage cannister and the second stage filter each contained 50 grams of the same activated carbon used in the filter system of the first car. In this case, the PNA's were reduced by 59%, thus showing the advantage of the two-stage filter design.

Figure 3:
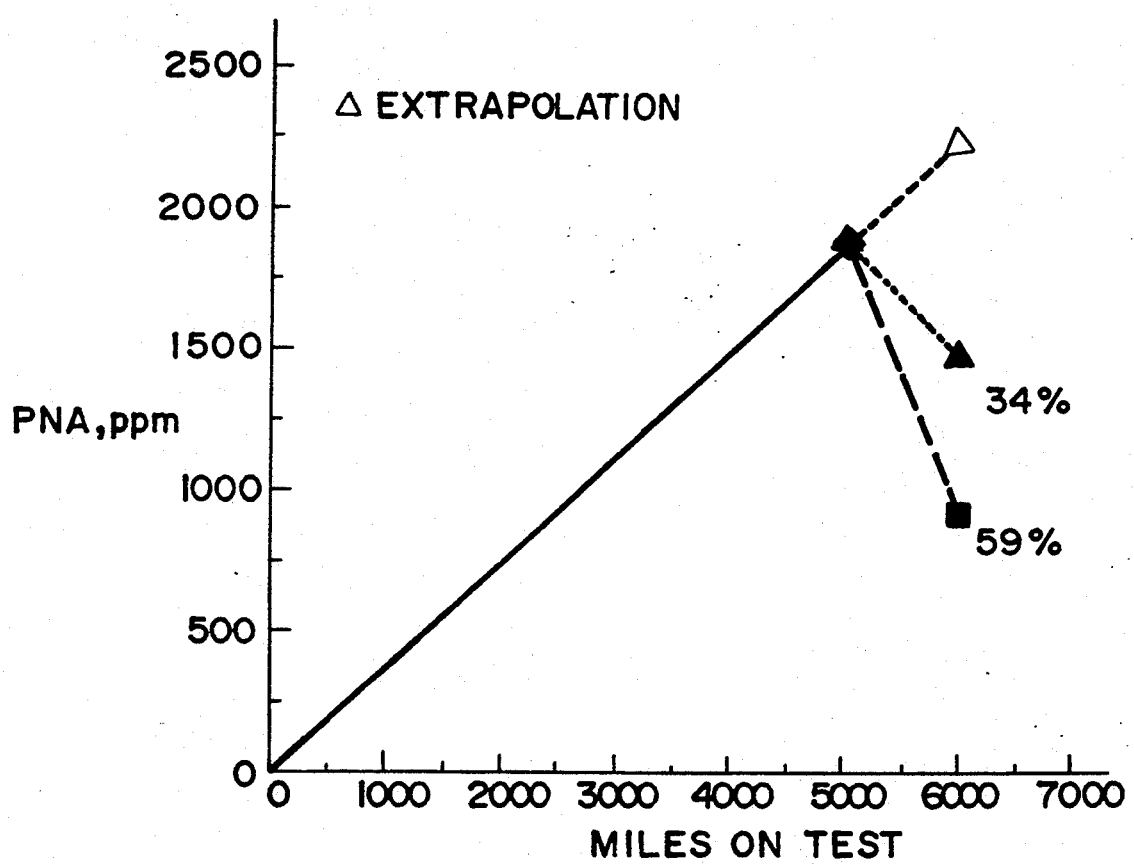
FIG. 3 is a graph showing the removal of polynuclear aromatics from used lubricating oil using the single-stage and two-stage embodiments of this invention.

These results are shown in FIG. 3.

EXAMPLE 2

A Comparison of Contacting Efficiency Using Single-Stage and Two-Stage Filter Systems An EMA SCOTE test (a single cylinder diesel engine test) using an ashless oil was performed using the single-stage filter system of FIG. 1 in which the chemically active filter media was 180 grams of ZnO pellets (commercially available as Katalco 85-1 from ICI Katalco). Visual observation at the end of the test confirmed that the lubricating oil had channeled through the filter media (i.e., a passage through the ZnO had formed which allowed oil to pass through the filter without good contact between the oil and ZnO).

A second EMA SCOTE test was performed using the two-stage filter system of FIG. 2 in which 180 grams ZnO pellets (Katalco 85-1) filled the first stage cannister as the chemically active filter media and the second-stage conventional filter contained only inactive filter media (pleated paper). Visual observation at the end of the test confirmed that there was no channeling through the ZnO.

Thus, the two-stage filter design provided better contact between lubricating oil and chemically active filter media than the single-stage design.

What is claimed is:

1. A method for rejuvenating a lubricating oil which comprises passing the lubricating oil, in series, through a filter system comprising a first filter housing that contains a chemically active filter media, a physically active filter media, or a mixture thereof, and then through a second filter housing that contains, in series, a chemically active filter media, a physically active filter media, or a mixture thereof, and an inactive filter media wherein in the first filter housing, the chemically active filter media contains at least two different chemically active filter media, wherein at least one chemically active filter medium is selected from the group consisting of a filter media containing a strong base, a filter media containing a hydroperoxide decomposer, and a filter media containing a dispersant function group, wherein the strong base is barium oxide (BaO), calcium carbonate ($CaCO_3$), calcium oxide (CaO), calcium hydroxide ($Ca(OH)_2$), magnesium carbonate ($MgCO_3$), magnesium hydroxide ($Mg(OH)_2$), magnesium oxide (MgO), sodium aluminate ($NaAlO_2$), sodium carbonate ($Na_2CO_3$), sodium hydroxide (NaOH), zinc oxide (ZnO), or their mixtures, and wherein the dispersant functional group complexes or reacts with sludge and varnish precursers in the oil.

2. The method of claim 1 wherein the difference chemically active filter media in the first filter housing are separated from one another.

3. The method of claim 1 wherein the filter system is within the lubrication system of an internal combustion engine.

4. The method of claim 1 wherein the strong base is magnesium oxide, sodium hydroxide, or zinc oxide.

* * * * *